United States Patent
Baudouin et al.

(10) Patent No.: US 11,142,169 B2
(45) Date of Patent: Oct. 12, 2021

(54) CLEANING DEVICE INTENDED FOR SPRAYING AT LEAST ONE FLUID TOWARDS A SURFACE TO BE CLEANED OF A DETECTION SYSTEM OF A MOTOR VEHICLE

(71) Applicant: Valeo Systèmes d'Essuyage, Le Mesnil Saint Denis (FR)

(72) Inventors: Maxime Baudouin, Issoire (FR); Giuseppe Grasso, Issoire (FR); Grégory Kolanowski, Issoire (FR); Thibaud Passerieux, Issoire (FR); Philippe Picot, Issoire (FR); Jordan Vieille, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 130 days.

(21) Appl. No.: 16/337,180

(22) PCT Filed: Jul. 28, 2017

(86) PCT No.: PCT/EP2017/069145
§ 371 (c)(1),
(2) Date: Mar. 27, 2019

(87) PCT Pub. No.: WO2018/059794
PCT Pub. Date: Apr. 5, 2018

(65) Prior Publication Data
US 2020/0031318 A1     Jan. 30, 2020

(30) Foreign Application Priority Data
Sep. 28, 2016   (FR) ...................... 1659194

(51) Int. Cl.
*B60S 1/52*     (2006.01)
*B08B 3/02*     (2006.01)
(Continued)

(52) U.S. Cl.
CPC ................ *B60S 1/528* (2013.01); *B08B 3/02* (2013.01); *B60S 1/56* (2013.01); *G02B 27/0006* (2013.01)

(58) Field of Classification Search
CPC ....... G02B 27/006; B08B 3/02; B60S 1/0848; B60S 1/0862; B60S 1/52; B60S 1/528; B60S 1/56; B60S 1/62
See application file for complete search history.

(56) References Cited

U.S. PATENT DOCUMENTS

| | | | |
|---|---|---|---|
| 2016/0101735 A1 | 4/2016 | Trebouet | |
| 2017/0259789 A1* | 9/2017 | McAndrew | ............... B60S 1/56 |
| 2018/0015908 A1* | 1/2018 | Rice | ..................... G05D 1/0088 |

FOREIGN PATENT DOCUMENTS

WO     2016/074933 A1     5/2016

OTHER PUBLICATIONS

International Search Report and Written Opinion in corresponding International Application No. PCT/EP2017/069145, dated Sep. 21, 2017 (10 pages).

* cited by examiner

*Primary Examiner* — David G Cormier
(74) *Attorney, Agent, or Firm* — Osha Bergman Watanabe & Burton LLP (57) ABSTRACT

A detection system (1) intended to equip a motor vehicle comprises at least one optical sensor (2) delimited by at least one curved optical surface (20). It also comprises at least one cleaning device (3) for cleaning the optical surface (20) that comprises a delivery ramp (4) for delivering at least one cleaning and/or drying fluid. According to the invention, the delivery ramp (4) has a curved shape, the curvature (C') of which is substantially equal to the curvature (C) of at least a portion (201, 202) of the optical surface (20).

14 Claims, 4 Drawing Sheets

(51) Int. Cl.
*B60S 1/56* (2006.01)
*G02B 27/00* (2006.01)

CLEANING DEVICE INTENDED FOR SPRAYING AT LEAST ONE FLUID TOWARDS A SURFACE TO BE CLEANED OF A DETECTION SYSTEM OF A MOTOR VEHICLE

The present invention relates to the field of the detection systems intended to equip a motor vehicle. It relates more particularly to a cleaning device for such a detection system.

The function of such detection systems is to collect information on the environment of the motor vehicle, in order to provide the driver with assistance in driving and/or in maneuvering this vehicle. To this end, the detection system is commonly installed on the vehicle so as to collect information on the environment in front, on the environment behind, or on the environment to the side of the vehicle: the detection system is therefore conventionally installed on the front face and/or on the rear face and/or on a rearview mirror of the vehicle.

Such locations are however particularly exposed to fouling such as dirty water, dust or other types of sprays. Now, such fouling forms an obstacle to the emission and to the reception of the information and can disrupt the operation of the detection system, even render this operation impossible.

The aim of the present invention is to propose a detection system for a motor vehicle, which is able to collect information on the environment of this vehicle in all circumstances, including when this detection system is subject to fouling sprays.

Such detection systems for motor vehicles are increasingly often triggered by the detection by a sensor of a signal, whether this signal be optical, electrical or of any other type.

In the context of the present invention, the outer surface of a sensor is understood to be a sensor surface subject to fouling originating from the environment, particularly in the context of a detection of distance from a vehicle or from an object in the vicinity of the vehicle equipped with the cleaning device according to the invention.

To this end, the subject of the present invention is a detection system intended to equip a motor vehicle, the detection system comprising at least one sensor delimited by at least one curved outer surface and at least one cleaning device for the optical surface, in which the cleaning device comprises a delivery manifold for at least one cleaning and/or drying fluid, characterized in that the delivery manifold has a curved form whose curvature is substantially equal to that of at least a portion of the outer surface.

Hereinbelow, the description will address more particularly, and in a nonlimiting manner, an optical sensor for which the outer surface to be cleaned is an optical surface.

Optical sensor is the term given for any sensor, such as a camera, laser sensor or the like, based on the emission and/or the detection of an electromagnetic radiation, in particular in the visible spectrum or in the spectrum invisible to the human eye, in particular the infrared. Optical surface denotes a surface that is at least partly transparent to such a radiation.

Advantageously, the axis of curvature of the delivery manifold is substantially parallel to the axis of curvature of said at least a portion of the optical surface.

Advantageously, the delivery manifold has a plurality of dispensing orifices configured to allow projection of one or more cleaning and/or drying fluids onto the optical surface of the optical sensor. According to the invention, these dispensing orifices are organized along a curved line whose curvature is substantially equal to that of the optical surface or to that of at least a portion thereof. More specifically, the axis of curvature of this curved line is substantially parallel to the axis of curvature of the optical surface or at least to that of a portion thereof.

According to an advantageous embodiment of the invention, the dispensing orifices are arranged in a dispensing channel configured in the delivery manifold, and this dispensing channel has a curvature substantially equal to that of the optical surface or, more generally, a curvature substantially homothetic to that of the optical surface or to that of at least a portion thereof. More specifically, the axis of curvature of this dispensing channel is advantageously substantially parallel to that of at least a portion of the optical surface.

The result of the curvature of the optical surface is that the projection, in a plane substantially at right angles thereto, of the detection field of the optical sensor, forms a first angular segment bounded by the edges of this optical surface in directions parallel to the generatrices of its curved form. In other words, the detection field of the optical sensor defines, on a determined plane, a first angular segment of angle substantially equal to a second angular segment of angle bounded in a plane parallel to said determined plane, about the axis of curvature of the delivery manifold, by the ends of the said delivery manifold.

According to a feature of the invention, this first angular segment is substantially equal to a second angular segment bounded, about the axis of curvature of the delivery manifold, by the ends of said delivery manifold, and defined in the same plane substantially at right angles to the optical surface.

Advantageously, the delivery manifold extends at a downstream end of a conveying body of extension axis, in particular substantially symmetrically on either side of said extension axis. The conveying body, for one or more cleaning and/or drying fluids of the cleaning device of the detection system, advantageously has an elongate form along a longitudinal extension axis. The delivery manifold thus comprises a first end portion by which it is attached to the conveying body, and a second portion in which the dispensing orifices are in particular arranged. Advantageously, the first end portion has an elongate form substantially coaxial with the conveying body to which it is attached, and it is the second portion of this delivery manifold which has the curved form described previously. According to a particularly advantageous embodiment of the invention, the second portion of the delivery manifold and, thus, the dispensing orifices arranged within it, extends on either side of the extension axis of the conveying body, in a curved direction transversal to that of this extension axis.

According to a preferred embodiment of the invention, the curved portion of the delivery manifold extends substantially symmetrically on either side of the extension axis of the conveying body in the abovementioned substantially transverse direction. More specifically, according to this preferred embodiment of the invention, the assembly formed by the delivery manifold and the conveying body has an axial plane of symmetry containing the extension axis common to the conveying body and to the first portion of the delivery manifold, called end portion. The axial plane of symmetry intersects, in particular at right angles, the abovementioned transverse curved direction. The angular segments defined previously therefore extend, in this case, substantially symmetrically relative to this axial plane of symmetry.

The optical surface can at least partly form a generally cylindrical or tapered form or a complex form; the result of the above is that the delivery manifold and, in particular the curved line along which the dispensing orifices arranged within it are organized, also has an envelope that is at least partly cylindrical, tapered or of complex form. The curved line along which the dispensing orifices are organized has a curvature substantially equal to the curvature of the optical surface or of at least a portion thereof.

According to a feature of the invention, the optical surface of the sensor comprises at least one first, emitting portion, through which an outgoing optical signal is emitted, and/or at least one second, receiving portion, through which an incoming optical signal is received. For example, the incoming optical signal is formed by the outgoing optical signal returned by the environment of the vehicle: such is the case, in particular, when the sensor implemented in the detection system is a laser sensor such as a lidar laser or the like.

Thus, the invention relates also to the cleaning of a sensor comprising only one emitting portion and comprising only one receiving portion. The optical detection system comprises, for example, two types of sensor to respectively perform the emission and reception functions, or else at least one sensor which comprises both of these emitting and receiving portions.

In the case of a sensor which comprises at least one emitting portion and at least one receiving portion, the latter can thus form one and the same continuous optical surface, or they can form distinct and concurrent zones, thus forming an optical surface comprising, for example, a first band and a second band of different inclinations, sharing a common edge between them.

When the emitting portion and the receiving portion form one and the same continuous optical surface, the invention provides for the curved forms previously described (curved form of the delivery manifold, curved form of the dispensing channel, curved form of the line along which the dispensing orifices are organized) to have curvatures equal to the curvature of the continuous optical surface. When the optical surface is presented as an emitting portion and a receiving portion forming distinct and concurrent zones, the invention can provide, according to different variant embodiments, for the curvatures of the curved forms previously described to be equal or substantially equal to the curvature of the emitting portion, or to the curvature of the receiving portion, or even to the mean curvature defined from the curved forms respectively of the emitting portion and of the receiving portion. It should be noted that, in this case, the cleanliness of the emitting portion being a key aspect of the effectiveness of the detection system, it will be able to be advantageous for the curvature of these curved forms to be substantially equal to the curvature of said emitting portion.

Advantageously, the invention provides for the delivery manifold to be placed, relative to the optical surface and to the detection field of the sensor, on a side of this optical surface arranged in a plane parallel to the plane in which the curvature of the delivery manifold is inscribed.

Advantageously, the conveying body is arranged on a reception housing for the optical sensor. The delivery manifold is therefore advantageously linked, by the conveying body to which it is attached, to such a housing. The result of the above is therefore that the conveying body and delivery manifold are advantageously arranged according to a predefined orientation facing the optical surface to be cleaned. More particularly, the conveying body can be accommodated on a face of a receiving housing for the optical sensor and in particular positioned substantially at right angles to at least a portion of said optical surface.

According to the invention, the delivery manifold is configured to be mobile between a first position, or position of rest, and a set of working positions in which it is separated from the optical surface in a direction substantially at right angles thereto and in particular a second position, or cleaning position.

According to the invention, the delivery manifold is configured to form, in the first position, at least in its curved portion, a surface that is substantially continuous with at least a part of the surface to be cleaned. More specifically, according to a particular embodiment of the invention in which the optical surface comprises an emitting first part and a receiving second part, the invention provides, in its position of rest, for the delivery manifold to form, in its curved portion, a surface that is substantially continuous with the surface of the emitting first portion of the optical surface.

According to another of its features, the invention provides, between its first position and its second position, for the delivery manifold to be displaced in a direction substantially at right angles to the optical surface, by moving away therefrom.

According to a feature of the invention, the conveying body comprises a telescopic portion at the free end of which is mounted the delivery manifold.

According to a particularly advantageous embodiment of the invention, the reception housing for the optical sensor has an axial plane of symmetry, containing in particular the optical axis of the optical sensor, as well as the axis of curvature of the optical surface or, according to the variant embodiment considered, at least one of the axes of curvature of an emitting portion or of a receiving portion of this optical surface. In this case, the invention provides for the extension axis of the conveying body to be also contained in this axial plane of symmetry. In this case, in the first position of the delivery manifold, the axes of curvature, respectively, of the optical surface or of at least one of the emitting or receiving portions of which it is composed, and/or of the delivery manifold, of the dispensing channel, and/or of the curved line along which the dispensing orifices are organized, substantially coincide. According to this same variant embodiment, these different axes of curvature are, when the delivery manifold is in a working position previously defined, that is to say in the displacement of the delivery manifold between the first and second positions, substantially aligned on the extension axis previously cited.

According to a feature of the invention, in the second position, the delivery manifold is separated from the optical surface in a direction substantially parallel to the optical axis defined by the optical surface. In other words, the delivery manifold is separated from the optical surface in a direction substantially at right angles to the optical surface, in the axial plane of symmetry of this optical surface.

The invention also extends to a method for cleaning and/or drying an optical surface of an optical sensor of a detection system as has just been described, wherein various regions of the optical surface are successively reached by the delivery manifold in its displacement between its first position and its second position.

Other features, details and advantages of the invention and of its operation will emerge more clearly on reading the description given hereinbelow by way of indication, in relation to the attached figures, in which.

It should first of all be noted that although the figures explain the invention in detail for its implementation, they can of course be used to better define the invention if appropriate. Likewise, it is recalled that, for all of the figures, the same elements are designated by the same references.

It is also recalled that, in the following description, the designations "upstream" and "downstream" refer to the direction of flow of the cleaning and drying fluids in the cleaning device of the detection system according to the invention. Thus, the designation "upstream" refers to the side of the cleaning device through which these cleaning and drying fluids are admitted into it, and the designation "downstream" refers to the side of the cleaning device through which the cleaning and drying fluids are dispensed out of the latter, toward an optical surface of a detection system of a motor vehicle.

Altogether, the figures illustrate a particularly advantageous embodiment of a detection system 1 according to the invention. According to this embodiment, the detection system 1 comprises in particular an optical sensor whose optical surface 20 is to be cleaned. In the example illustrated, the optical surface 20 has two distinct portions, namely an emitting first portion 201 and a receiving second portion 202. The emitting portion 201 and the receiving portion 202 of the optical surface 20 are, here, curved and each have a substantially cylindrical envelope surface. The emitting 201 and receiving 202 portions are, here, distinct and concurrent, so that the optical surface 20 is formed by a first band corresponding to the emitting portion 201 and a second band corresponding to the receiving portion 202. These two bands share a common edge 203.

According to this embodiment of the invention, the detection system 1 has an axial plane of symmetry P1 passing through the axes of curvature respectively of the emitting portion 201 and of the receiving portion 202. The common edge 203 between the emitting portion 201 and the receiving portion 202 is substantially at right angles to the axial plane of symmetry P1. The forms and the dimensions respectively of the emitting portion 201 and of the receiving portion 202 or, more generally, of the optical surface 20, define a detection field 21 of the optical sensor. This detection field 21 is defined as the solid angle in which an object A will be able to be reached by the outgoing signal 7 emitted by the emitting portion 201 in such a way that the incoming signal 8 returned by said object A will be received by the receiving portion 202 of the optical surface 20.

Figure 1A:
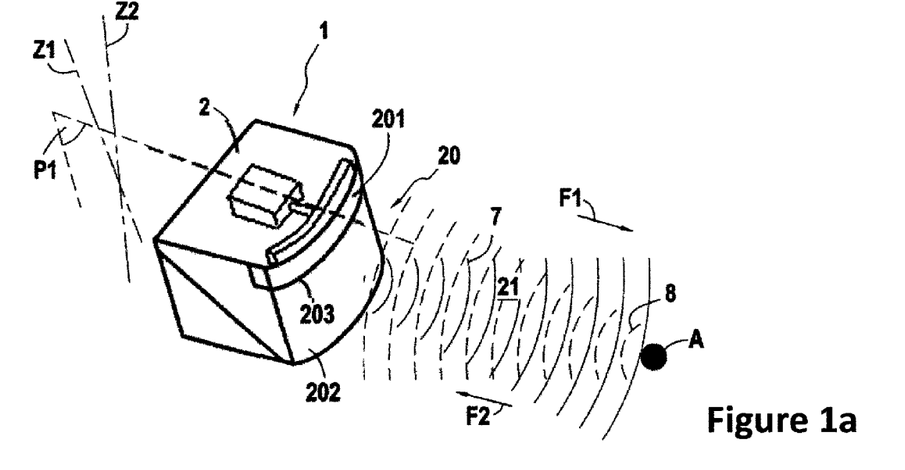
FIGS. 1a to 1c are general schematic views respectively illustrating the principle of operation of a detection system of a type more particularly targeted by the invention, the different uses of such a system for detecting people, objects or third-party vehicles on the road scene, and an example of the locating of such a system in a motor vehicle.
Figure 1B:
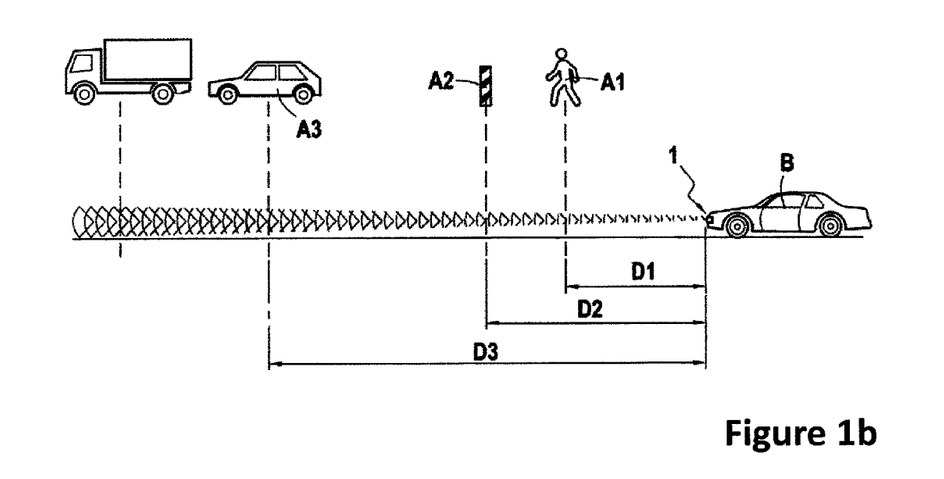
Figure 1C:
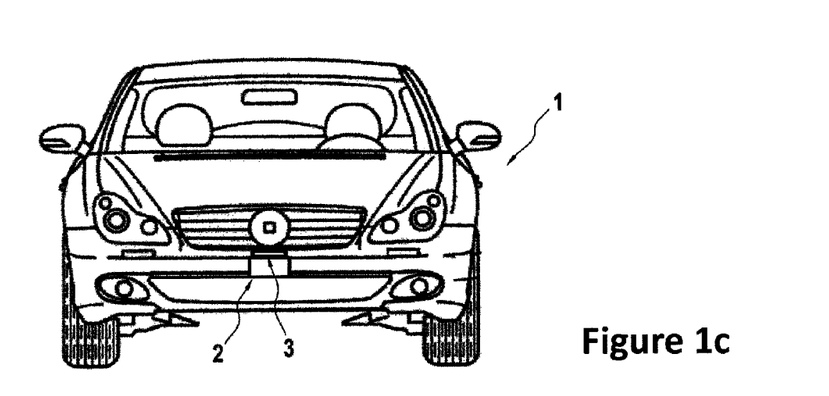

FIG. 1 illustrates the operation of such a detection system 1 and the associated FIG. 1a illustrates its various possibilities of use. An outgoing optical signal 7, illustrated by the solid line concentric forms in FIG. 1, is emitted by the emitting portion 201, in the general direction represented by the arrow F1. When this signal encounters an object A placed on its path, it is returned, by this object A, as an incoming optical signal 8, illustrated by the dotted line concentric forms in FIG. 1. This incoming optical signal 8 is returned, in the general direction represented by the arrow F2, toward the receiving part 202 of the detection system 1. The outgoing signal 7 and the incoming signal 8 are then compared by analysis means configured in the detection system 1 to deduce therefrom information concerning the form and the position of the object A.

Thus, as FIG. 1a shows, such a detection system 1, for example placed at the front of a vehicle B, will be able to provide the driver of said vehicle B with information relating both, for example, to the nature and to the distance which separates the vehicle B from different types of objects situated in the detection field 21 of the optical sensor: pedestrian A1 situated at a distance D1 from the vehicle B, road signaling element A2 situated at a distance D2, other vehicle(s) A3 situated at a distance D3, etc.

It will easily be understood that the quality of the outgoing 7 and incoming 8 signals is critically important for the correct and reliable operation of the detection system 1. The cleanliness of the emitting portion 201 and of the receiving portion 202 is, in particular, a key element to the quality of the signals emitted and/or received by the optical surface 20. It is therefore crucially important to have a device 3 which makes it possible to keep the emitting portion 201 and the receiving portion 202 of the optical surface 20, or, more generally, the optical surface 20, clean over all of the detection field 21 of the optical sensor.

Figure 2:
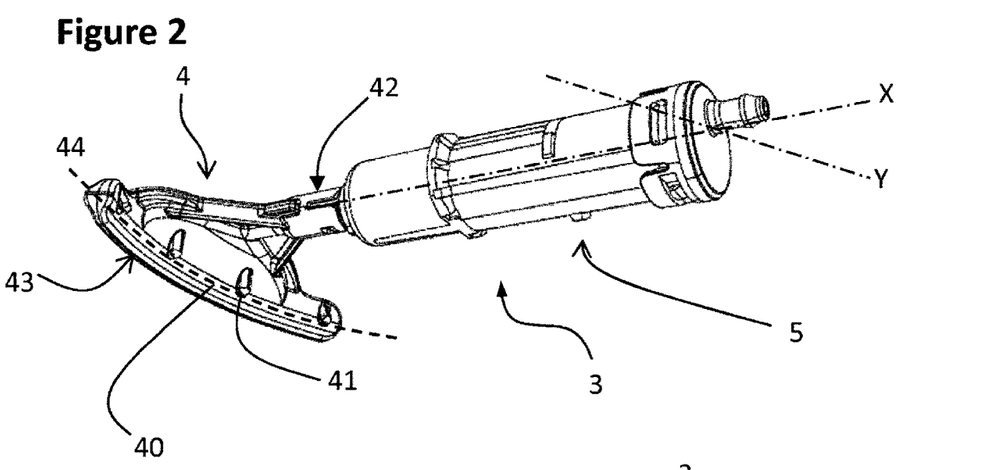
FIG. 2 is a perspective schematic view of a cleaning device equipped with a delivery manifold.
Figure 3:
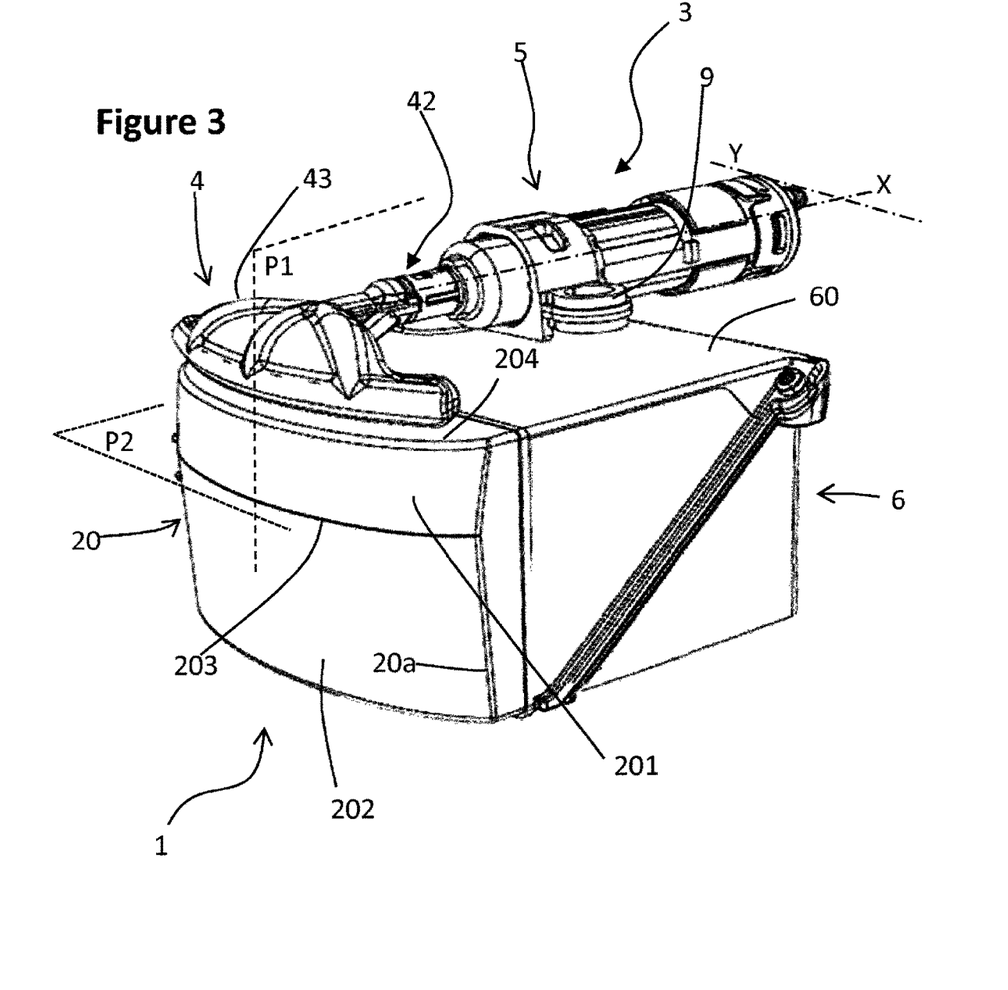
FIG. 3 is a perspective schematic view of a detection system according to the invention, with a device for cleaning a housing of an optical sensor in a configuration in which the delivery manifold is in its position of rest.
Figure 4:
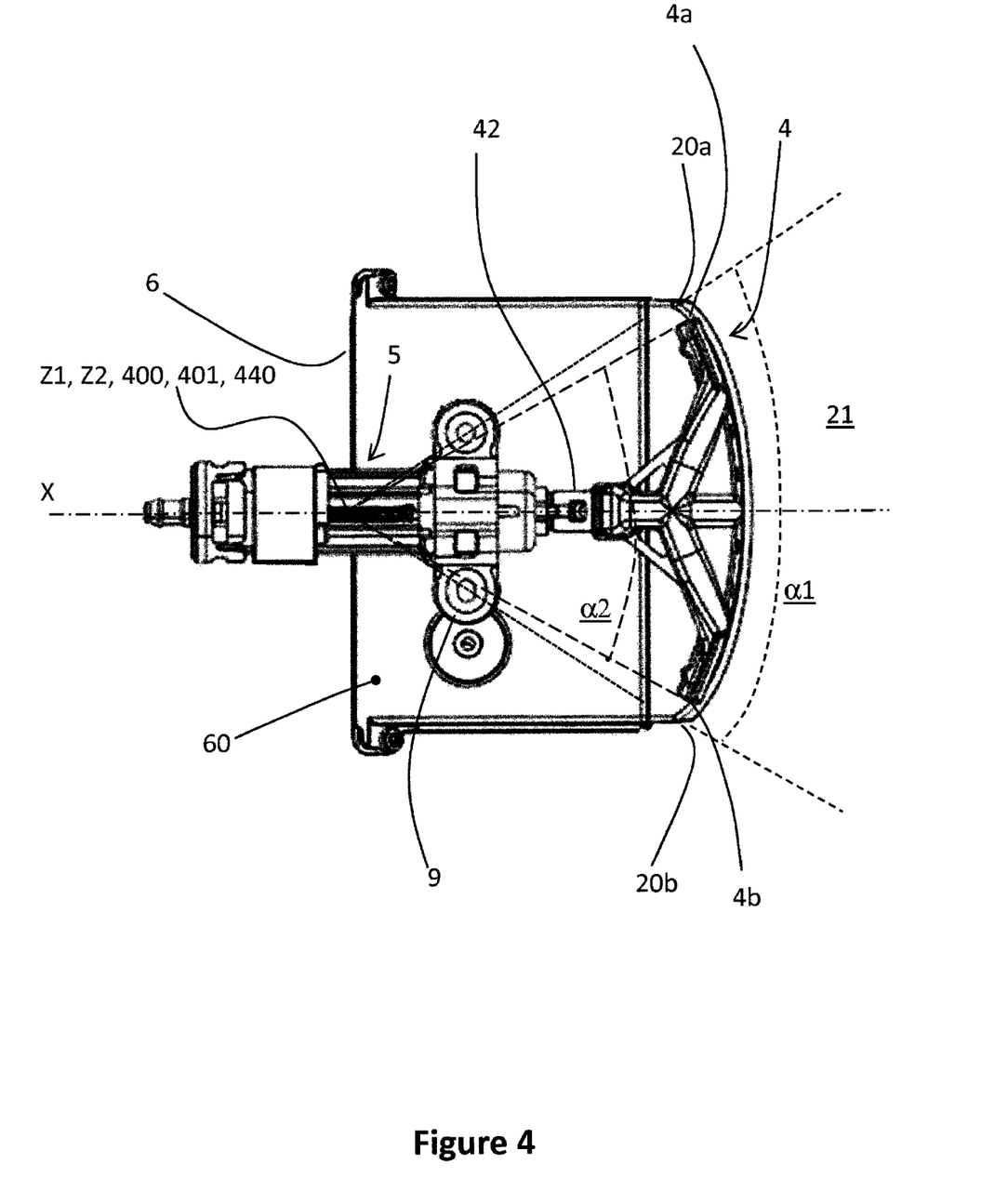
FIG. 4 is a plan schematic view of a detection system according to the invention, in a configuration in which the delivery manifold of the cleaning device is in its position of rest.
Figure 5:
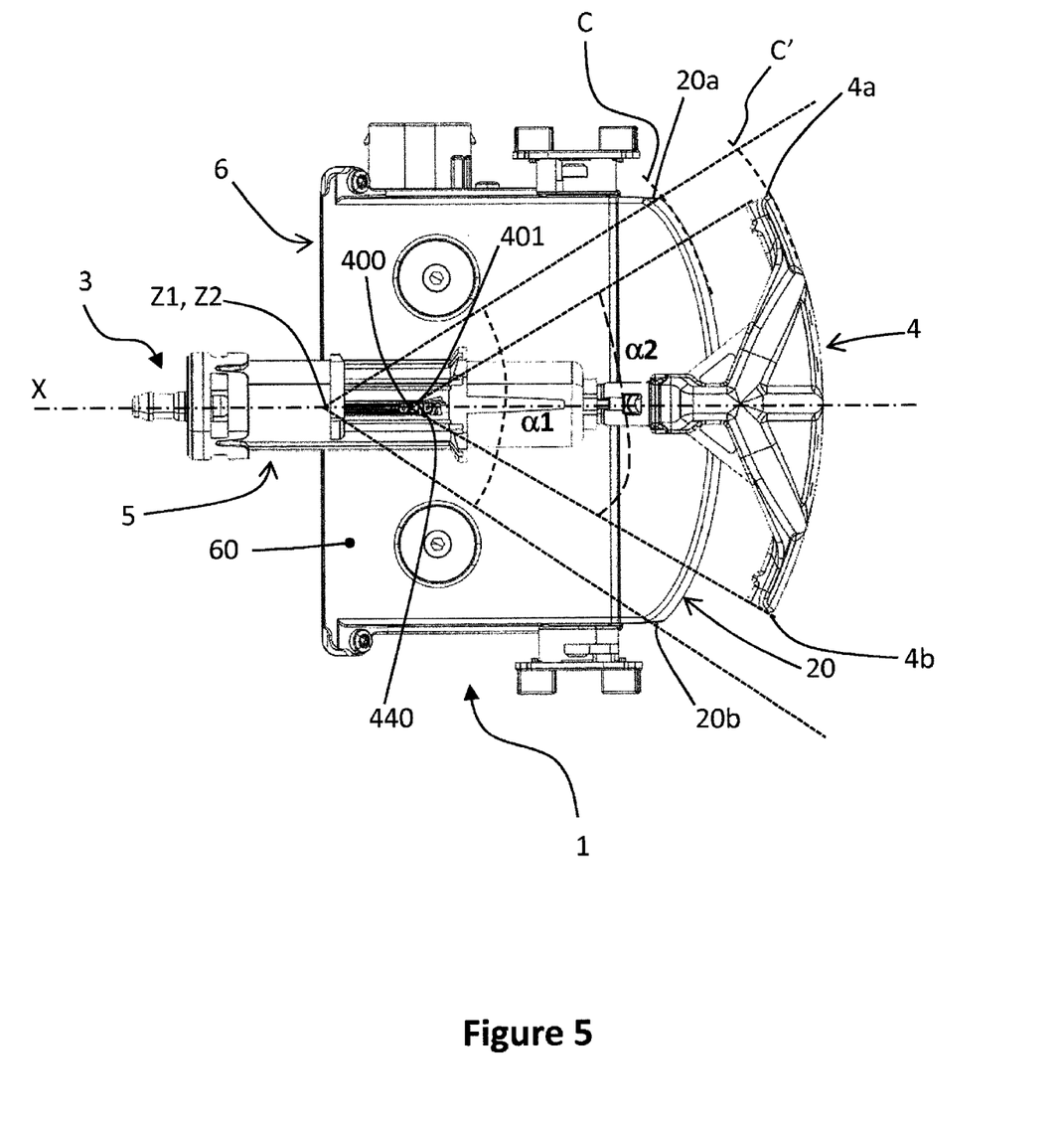
FIG. 5 is a plan schematic view of a detection system according to the invention, in a configuration in which the delivery manifold of the cleaning device is in a working position, separated from the optical surface.

FIG. 2 illustrates a part of such a cleaning device 3 and FIGS. 3 to 5 illustrate the relative arrangement of such a cleaning device 3 and of such a detection system.

Referring to these different figures, the cleaning device comprises in particular a delivery manifold 4 configured to allow one or more cleaning and/or drying fluids to be sprayed onto the optical surface 20 to be cleaned. To this end, and as FIG. 2 more particularly shows, the delivery manifold 4 comprises in particular a dispensing channel 40 in which is arranged a plurality of dispensing orifices 41 through which the cleaning and/or drying fluid or fluids are sprayed onto the optical surface 20.

In the detection system 1 according to the invention, the delivery manifold 4 of the cleaning device is mobile between a first position, or position of rest, more particularly illustrated by FIGS. 3 and 4, and a second position, more particularly illustrated by FIG. 5.

According to the invention, the optical surface 20 has a curved form and the delivery manifold 4 has an equivalent curved form. More specifically, according to the invention, the delivery manifold 4 has a curvature C' substantially equal to the curvature C of the optical surface 20, as is in particular made visible in FIG. 6. The curvature of the delivery manifold and that of the optical surface are defined in planes parallel to the main direction of emission of the incoming and outgoing optical signals of the detection signal. Even more specifically, in the detection system 1 according to the invention, the delivery manifold 4 is arranged relative to the optical surface 20 so that its axis of curvature 400, that is to say the axis about which the curved portion of the delivery manifold is circumvoluted, is substantially parallel to the axis of curvature of the optical surface 20 or, according to the embodiment more particularly illustrated by the figures, to at least one of the axes of curvature, respectively Z1, Z2 of the emitting portion 201 or of the receiving portion 202 of this optical surface 20.

Advantageously, the dispensing channel 40 is curved, and the dispensing orifices 41 arranged within it are organized along a curved line 44. In this context, provision can be made for the curvature of the dispensing channel 40 to be equal to that of the optical surface 20, and/or for the curvature of the curved line 44 along which the dispensing orifices 41 are organized to be equal to the curvature of the optical surface 20. As has been described previously, the axis of curvature 401 of the dispensing channel 40 is substantially parallel to the axis of curvature of the optical surface 20 or, according to the embodiment more particularly illustrated by the figures, to the axis of curvature, respectively Z1, Z2, of at least one of the emitting 201 or receiving 202 portions of this optical surface 20, and the same applies for the axis of curvature 440 of the curved line 44 along which the dispensing orifices 41 are organized.

According to the embodiment of the invention more particularly illustrated by the figures, in which the optical surface 20 has an emitting portion 201 and a receiving portion 202 of different curvatures, the delivery manifold 4 has a curvature substantially equal to that of the emitting portion 201. Indeed, in a detection system such as that illustrated by FIG. 1, the cleanliness of this emitting portion 201 is vitally important for the emission of a reproducible detection signal: it is therefore important for this portion of the optical surface 20 to be as clean as possible. To this end, it is important for a cleaning and/or drying fluid sprayed by the delivery manifold onto the optical surface 20 and, in particular, onto the emitting surface 201 thereof, to reach all of this surface to ensure a cleaning of optimal efficiency. That is made possible in particular both by the particular form of the delivery manifold 4 and by its spatial configuration relative to the optical surface 20, which will be detailed hereinbelow.

The cleaning device 3 also comprises a conveying body 5 for the cleaning and/or drying fluid or fluids. The conveying body 5 has an elongate form along an extension axis X. According to the embodiment of the invention more particularly illustrated by the figures, the conveying body 5 has a generally substantially cylindrical envelope form of axis X. At its upstream end, the conveying body 5 is linked to a cleaning and/or drying fluid supply assembly, not represented in the figures. This supply assembly comprises, for example, a fluid storage tank, and one or more pipelines linking the storage tank to the conveying body 5. At its downstream end, the conveying body 5 is attached to delivery manifold 4. More specifically, according to the embodiment of the invention more particularly illustrated by the figures, the conveying body 5 is attached, at its downstream end, to an end portion 42 of the delivery manifold 4 having an elongate form of extension axis X. In other words, the delivery manifold 4 is attached here to the conveying body 5 by an end portion 42 which coaxially extends said conveying body 5. Thus, at its upstream end, the delivery manifold 4 is attached to the conveying body 5 by its end portion 42 and, at its downstream end, it has a curved second portion 43, whose curvature is similar to that of the emitting portion 201 of the optical surface 20, a curved portion 43 in which the dispensing orifices 41 are arranged. According to the invention, the displacement of the delivery manifold 4 between its first position of rest, and its second position, takes place in a direction parallel to that of the extension axis X.

Advantageously, the delivery manifold 4 is attached to the conveying body 5 in such a way that its curved portion 43 extends on either side of the downstream end of the conveying body 5 in a direction transversal to the extension axis X thereof. More specifically, according to the embodiment of the invention illustrated by the figures, this curved portion 43 extends substantially symmetrically, in a transverse direction Y substantially at right angles to the extension axis X, on either side of the downstream end of the conveying body 5.

Advantageously, and as FIGS. 3 to 5 show, the conveying body 5 is attached to a reception housing 6 in particular for the optical sensor of the detection system 1. More specifically, according to the embodiment more particularly illustrated by the figures, the conveying body 5 is fixed, by appropriate fixing means 9, onto an accommodating face 60 of the reception housing 6. It should be noted that, according to different embodiments, the reception housing 6 can be a reception housing for all of the detection system 1 or for just the optical sensor.

According to the invention, the accommodating face 60 is substantially at right angles to the optical surface 20 and extends therefrom. According to the embodiment illustrated by the figures, this accommodating face 60 is also substantially at right angles to the axial plane of symmetry P1 defined previously. More specifically, according to this particular embodiment, the edge of intersection of the accommodating face 60 with the optical surface 20 is an edge of the emitting portion 201. According to this embodiment of the invention, the conveying body 5 is arranged on the accommodating face 60 so that its extension axis X is located both substantially parallel to the accommodating face 60 and included in the axial plane of symmetry P1 previously defined.

It follows therefrom that, since the displacement of the delivery manifold 4 between its first position, of rest, and its second position is performed in a direction substantially parallel to that of the extension axis X, this displacement is performed with the delivery manifold 4 which moves away from the optical surface 20 in a direction substantially at right angles thereto. Another result of the above is that the delivery manifold 4, whatever its position between its position of rest and its second position, is situated on the side of the accommodating face 60 of the housing 6 opposite the optical surface 20.

The forms and dimensions of the delivery manifold 4 and, in particular, of its curved portion 43, are defined, according to the invention, so that, in the position of rest of the delivery manifold 4, more particularly illustrated by FIGS. 2 and 5, the latter forms, with the optical surface 20, a substantially continuous surface. According to the embodiment more particularly illustrated by the figures, the forms and dimensions of the delivery manifold 4 are defined so that, in the position of rest of the delivery manifold 4, the latter forms a substantially continuous surface with the emitting portion 201 of the optical surface 20.

The delivery manifold 4 is arranged relative to the optical surface 20 in such a way that a cleaning and/or drying fluid sprayed by the dispensing orifices 41 can reach all of said optical surface 20, in particular the edges thereof, respectively 20a and 20b, in the transverse direction Y of the system, that is to say the main direction of extension of the delivery manifold, and whether or not this optical surface 20 takes the form of one or more emitting/receiving portions. This is more particularly illustrated by FIGS. 4 and 5, which present plan views of the detection system 1 according to the invention, respectively in the position of rest of the delivery manifold 4 and in a working position thereof.

Referring to these figures, the detection field 21 (referenced in FIG. 4) of the optical sensor forms a solid angle of which a section, in a plane P2 substantially at right angles to the axial plane of symmetry P1 previously defined and substantially parallel to the extension axis X of the conveying body 5, forms a first angular segment of angle a1 delimited by the edges, respectively 20a and 20b, of the optical surface 20 substantially at right angles to the plane P2.

On this same plane P2, it is possible to define a second angular segment of angle a2, delimited, in this plane P2, by the ends, respectively 4a and 4b, of the delivery manifold 4, particularly in its curved portion 43, on either side of the line of the extension axis X and of the axial plane of symmetry P1 previously defined, about the axis of curvature 400 of said delivery manifold 4.

The first angular segment of angle a1 previously defined is advantageously substantially equal to the second angular segment of angle a2, this allowing a fluid sprayed by the delivery manifold to reach all of the optical surface, in particular the edges thereof in a direction substantially at right angles to that of the plane P2 previously defined.

According to the embodiment of the invention more particularly illustrated by the figures, and as FIGS. 4 and 5 more particularly illustrate, the cleaning device 3 is arranged in the detection system 1 in such a way that, when the delivery manifold 4 is in its position of rest, the axis of curvature of the optical surface 20 substantially coincides with the axis of curvature 400 of the delivery manifold 4, and possibly with the axis of curvature 440 of the curve line 44 along which the dispensing orifices 41 are organized and with the axis of curvature 401 of the dispensing channel 40. Moreover, according to this same embodiment, and as FIG. 5 more particularly shows, when the delivery manifold 4 is in one of its working positions, at least one of the axes of curvature, respectively Z1, Z2, of the emitting portion 201 and of the receiving portion 202 of the optical surface 20, the axis of curvature 400 of the delivery manifold 4, the axis of curvature 401 of the dispensing channel 40 and the axis of curvature 440 of the curved line 44 along which the dispensing orifices 41 are organized, are substantially aligned on the extension axis X.

This particular form and this particular arrangement of the delivery manifold 4 relative to the optical surface 20 allow a fluid sprayed by the dispensing orifices 41 to reach, whatever the position of the delivery manifold 4 relative to the optical surface 20, all of this optical surface. The invention thus makes it possible to perform an efficient cleaning of the optical surface 20 of the optical sensor over all of the detection field 21 of this optical sensor. This is made possible, on the one hand, by the very form of the delivery manifold and, on the other hand, by its particular arrangement on the side of the accommodating face 60 of the reception housing 6, an arrangement by virtue of which the displacement of said delivery manifold 4 between its first position and its working positions takes place in a direction substantially at right angles to that of this optical surface 20.

Moreover, it is advantageous for the dispensing orifices to be oriented such that the cleaning and/or drying fluid which leaves these orifices arrives on the optical surface with an angle of attack that is defined and it is at least equal to a threshold value of 20°. It will be understood that this value is given as an indicative example, and that the important thing is for the orifices to be arranged in such a way that the direction of the sprayed fluid is not tangential to the optical surface to be cleaned.

The fluid injection assembly of the cleaning device 3 is for example configured so that the injection of fluid into the delivery manifold 4 and, therefore, the spraying of fluid onto the optical surface 20, is allowed substantially as soon as the delivery manifold 4 leaves its first position, or position of rest.

In a variant, the delivery manifold, in its displacement from the first position, must reach a predefined intermediate position for the spraying of fluid onto the surface to be cleaned to be able to be implemented.

In the example illustrated, the relative position of the delivery manifold 4 relative to the optical surface 20 causes, in the first instance of the displacement of this delivery manifold 4, the cleaning and/or drying fluid or fluids to be first of all sprayed onto the emitting portion 201 of the optical surface 20, then, as the delivery manifold 4 moves away from the optical surface 20, then to be sprayed toward the receiving portion 202 of the optical surface, more specifically toward the regions of this receiving portion increasingly far away from the emitting portion 201. Since the emitting portion 201 is reached substantially in all the positions of the delivery manifold 4, its cleaning will be thus reinforced. The invention therefore makes it possible to perform both an optimal cleaning over all of the optical surface 20 and a reinforced cleaning of the emitting portion 201 of this optical surface 20.

In the example illustrated, the configuration of the delivery manifold 4 relative to the optical surface 20 allows a fluid dispensed by the delivery manifold 4 to flow over all the surface to be cleaned. This gravity flow can thus participate in the cleaning of the surface, in particular alternately or complementing the cleaning fluid spraying pressure.

The invention would not however be limited to the means and configurations described and illustrated, and it applies equally to all equivalent means or configurations and to any combination of such means. In particular, while the invention has been described here in an embodiment in which the general geometry of the conveying body 5 is a cylindrical geometry, it goes without saying that the invention applies to any type of geometry and forms, insofar as the elements producing the different functionalities described here are present. Likewise, while the invention is described here in an embodiment in which the conveying body 5 is fixed onto the accommodating face 60 of the reception housing 6 and directly attached to the delivery manifold 4, it applies more generally to the case where the conveying body 5 is situated in a stable relative position relative to the optical surface 2 and linked, by appropriate means, to the delivery manifold 4 configured as described in the present document.

The invention claimed is:

1. A detection system to equip a motor vehicle, the detection system comprising:
   at least one sensor delimited by at least one curved outer surface, the at least one sensor comprising:
      an emitting portion that emits an outgoing optical signal to determine a distance between the detection system and an object, and
      a receiving portion that receives an incoming optical signal formed by the outgoing optical signal to determine the distance after being returned by the object; and
   at least one cleaning device for the at least one curved outer surface comprising a delivery manifold for at least one cleaning and/or drying fluid,
   wherein the delivery manifold has a curved form whose curvature is equal to the curvature of at least a portion of the at least one curved outer surface,
   wherein a plurality of fluid dispensing orifices are arranged in a fluid dispensing channel pierced in the delivery manifold, and
   wherein the plurality of fluid dispensing orifices are organized along a curved line along the fluid dispensing channel, whose curvature is equal to that of at least a portion of the at least one curved outer surface.

2. The detection system as claimed in claim 1, wherein a detection field of the at least one sensor defines, on a determined plane, an angular segment of a first angle equal to an angular segment of a second angle bounded on a plane parallel to said determined plane, about an axis of curvature of the delivery manifold, by end portions of said delivery manifold.

3. The detection system as claimed in claim 2, wherein the delivery manifold extends along an extension axis to a downstream end of a conveying body, the delivery manifold being symmetrical on either side of said extension axis.

4. The detection system as claimed in claim 3, wherein the extension axis is parallel to the determined plane.

5. The detection system as claimed in claim 1, wherein the delivery manifold is configured to form, in a first position, a surface that is continuous with at least a portion of the at least one curved outer surface.

6. The detection system as claimed in claim 3, wherein the delivery manifold is mobile between a first position and a second position.

7. The detection system as claimed in claim 6, wherein the conveying body comprises a telescopic portion at a free end where the delivery manifold is mounted.

8. The detection system as claimed in claim 6, wherein in the first position of the delivery manifold, the axes of curvature respectively of at least a portion of the at least one curved outer surface, of the delivery manifold, of the dispensing channel, and of the curved line along which the plurality of fluid dispensing orifices are organized, coincide.

9. The detection system as claimed in claim 6, wherein in the second position the delivery manifold is separated from the at least one curved outer surface in a direction parallel to an optical axis defined by an optical surface.

10. The detection system as claimed in claim 6, wherein in a displacement of the delivery manifold between the first and second positions, the axes of curvature respectively of at least a portion of the at least one curved outer surface, and of the curved line along which the plurality of fluid dispensing orifices are organized, are aligned along the extension axis.

11. The detection system as claimed in claim 3, wherein the conveying body is accommodated on a face of a reception housing of the at least one sensor and positioned at right angles to a portion at least of said at least one curved outer surface.

12. The detection system as claimed in claim 1, wherein the at least one curved outer surface comprises an emitting portion and/or a receiving portion.

13. A motor vehicle equipped with a detection system, the detection system comprising:
   at least one sensor delimited by at least one curved outer surface, the at least one sensor comprising:
      an emitting portion that emits an outgoing optical signal to determine a distance between the detection system and an object, and
      a receiving portion that receives an incoming optical signal formed by the outgoing optical signal to determine the distance after being returned by the object; and
   at least one cleaning device for the at least one curved outer surface comprising a delivery manifold for at least one cleaning and/or drying fluid,
   wherein the delivery manifold has a curved form whose curvature is equal to the curvature of at least a portion of the at least one curved outer surface,
   wherein a plurality of fluid dispensing orifices are arranged in a fluid dispensing channel pierced in the delivery manifold, and
   wherein the plurality of fluid dispensing orifices are organized along a curved line along the fluid dispensing channel, whose curvature is equal to that of at least a portion of the at least one curved outer surface.

14. A detection system to equip a motor vehicle, the detection system comprising:
   at least one sensor delimited by at least one curved outer surface, the at least one sensor comprising:
      an emitting portion that emits an outgoing optical signal to determine a distance between the detection system and an object, and
      a receiving portion that receives an incoming optical signal formed by the outgoing optical signal to determine the distance after being returned by the object; and
   at least one cleaning device for the at least one curved outer surface comprising a delivery manifold for at least one cleaning and/or drying fluid,
   wherein the delivery manifold has a curved form whose curvature is equal to the curvature of at least a portion of the at least one curved outer surface,
   wherein a plurality of fluid dispensing orifices are arranged in a fluid dispensing channel pierced in the delivery manifold,
   wherein the plurality of fluid dispensing orifices are organized along a curved line along the fluid dispensing channel, whose curvature is equal to that of at least a portion of the at least one curved outer surface,
   wherein a detection field of the at least one sensor defines, on a determined plane, an angular segment of a first angle equal to an angular segment of a second angle bounded on a plane parallel to said determined plane, about an axis of curvature of the delivery manifold, by end portions of said delivery manifold, and
   wherein the delivery manifold extends along an extension axis to a downstream end of a conveying body.

\* \* \* \* \*